(12) United States Patent
Willinger et al.

(10) Patent No.: US 7,201,115 B2
(45) Date of Patent: Apr. 10, 2007

(54) BIRDCAGE WATERER

(75) Inventors: Jonathan Willinger, Tenafly, NJ (US); Klaus Woltmann, Demarest, NJ (US)

(73) Assignee: JW Pet Company Inc., Teterboro, NJ (US)

( * ) Notice: Subject to any disclaimer, the term of this patent is extended or adjusted under 35 U.S.C. 154(b) by 0 days.

(21) Appl. No.: 10/910,248

(22) Filed: Aug. 3, 2004

(65) Prior Publication Data

US 2005/0034678 A1    Feb. 17, 2005

Related U.S. Application Data

(63) Continuation-in-part of application No. 10/371,646, filed on Feb. 21, 2003.

(60) Provisional application No. 60/370,200, filed on Apr. 5, 2002.

(51) Int. Cl.
*A01K 7/00* (2006.01)
*A01K 39/02* (2006.01)

(52) U.S. Cl. .............................. 119/464; 119/72; 119/74

(58) Field of Classification Search ................ 119/464, 119/465, 467, 475, 477, 51.01, 51.03, 52.1, 119/52.2, 57.8, 705, 72.72, 5, 73, 74, 78, 119/79, 80, 460, 77
See application file for complete search history.

(56) References Cited

U.S. PATENT DOCUMENTS

| | | | | |
|---|---|---|---|---|
| 1,446,740 A | * | 2/1923 | Eummelen | 119/464 |
| 1,450,494 A | * | 4/1923 | Eummelen | 119/464 |
| 1,530,657 A | * | 3/1925 | Eummelen | 137/454 |
| 1,755,706 A | * | 4/1930 | St George | 119/464 |
| 3,707,949 A | * | 1/1973 | Lippi | 119/477 |
| 4,450,789 A | * | 5/1984 | Nilsen et al. | 119/477 |
| 4,762,086 A | * | 8/1988 | Atchley | 119/477 |
| 5,351,645 A | * | 10/1994 | Brennon | 119/475 |
| 5,949,456 A | * | 9/1999 | Matsumoto et al. | 347/85 |
| 6,189,489 B1 | * | 2/2001 | Pearce | 119/477 |
| 6,308,657 B1 | * | 10/2001 | Schumacher et al. | 119/72 |
| 6,561,129 B1 | * | 5/2003 | Cheng | 119/72.5 |

* cited by examiner

*Primary Examiner*—Son T. Nguyen
(74) *Attorney, Agent, or Firm*—Katten Muchin Rosenman LLP

(57) ABSTRACT

A birdcage watering device is provided with a no-spill valve and method of attachment. The watering device comprises a valve attached to a water chamber comprising an extended leg such that when the watering device is completely assembled the valve may be displaced to fill trough. Particularly, the extended leg of the valve produces an angled opening to permit flow of water from the water chamber without clogging or getting "stuck" in the valve opening. The water chamber is easily removed for refilling and the valve is designed to prevent the spilling of water during the process. A method of attachment is also described that allows the device to be on the outside of the birdcage while being secured from the inside of the cage, thus allowing for easy refilling of the water chamber of the device.

22 Claims, 9 Drawing Sheets

_US 7,201,115 B2_

BIRDCAGE WATERER

RELATED APPLICATIONS

The present application is a continuation-in-part of U.S. application Ser. No. 10/371,646 filed Feb. 21, 2003, which claims priority under 35 U.S.C. 119(e) from U.S. application Ser. No. 60/370,200 filed Apr. 5, 2002.

BACKGROUND OF THE INVENTION

1. Field of Invention

The present invention relates generally to the field of birdcage attachments. More specifically, the present invention is related to birdcage watering devices.

2. Discussion of Prior Art

In prior birdcage attachments, water is stored in a number of ways. First, water may be placed in a cup that attaches to the inside of the cage bars. A problem with this method is that water often spills while filling the cup, and, when placing it in the cage, water may spill inside the cage. Also, a bird may often splash the water from the cup around the cage. Another existing method utilizes a water reservoir that rests on a device having a channel which extends to give the bird access to the water. The water reservoir is filled and the entire unit is placed in the cage and mounted on the outside of cage. The major disadvantage is that the entire unit must be removed from the cage for refilling of the water chamber. There is, therefore, a desire for a birdcage watering device that allows for easy refilling of a water chamber without the possibility of spilling while allowing for easy mounting and dismounting of the chamber from a cage.

Whatever the precise merits, features, and advantages of the above cited references, none of them achieves or fulfills the purposes of the present invention.

SUMMARY OF THE INVENTION

A unique no-spill valve is used in a birdcage watering device that creates an angled opening such that water may easily flow through to a trough. In the preferred embodiment, the valve comprises a plurality of legs wherein at least one of the legs is longer than the others to create the angled opening. The valve is part of a water holding device and is designed to allow free flow from a water holding chamber into a trough when properly assembled in a holder. During refilling, the valve prevents the chamber from leaking. The holder is mounted to the birdcage such that the water holding device may be removed for refilling the chamber without removing the entire device from the birdcage. The holder is preferably mounted to the outside of the birdcage.

DESCRIPTION OF THE PREFERRED EMBODIMENTS

Figure 1A:
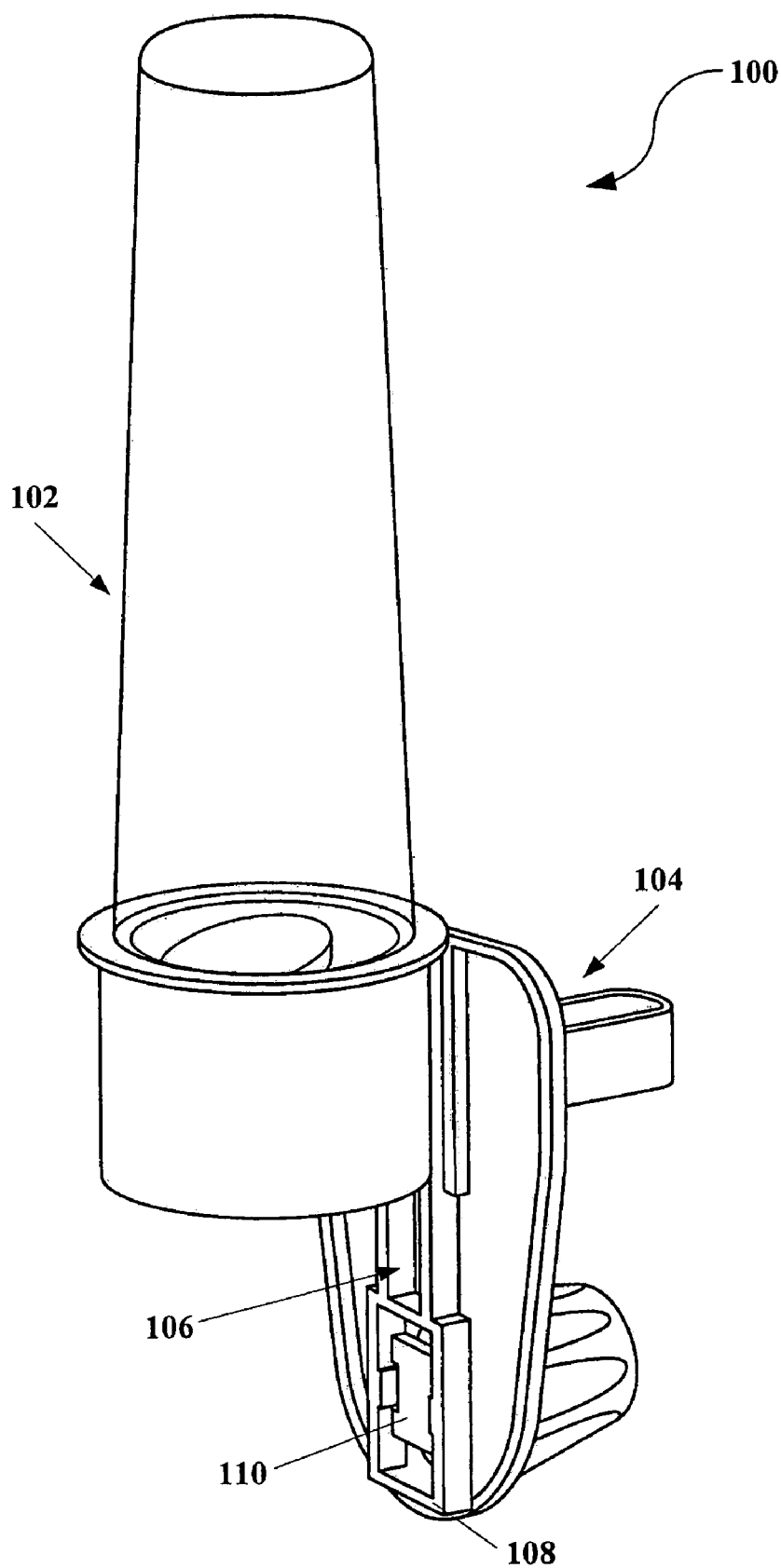
FIG. 1a illustrates a birdcage watering device of the present invention.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 1B:
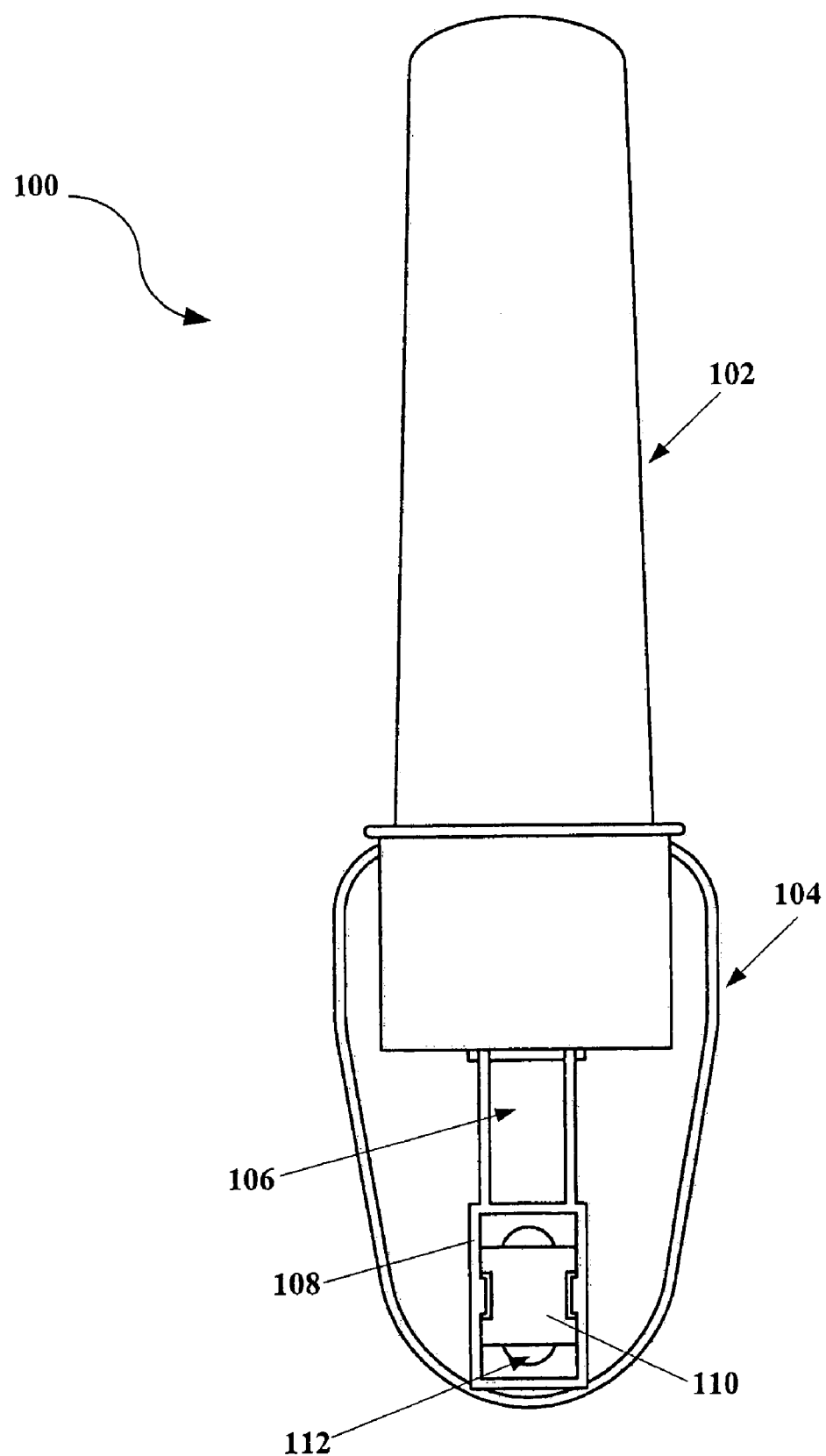
FIG. 1b illustrates a rear view of the birdcage watering device.
Figure 1C:
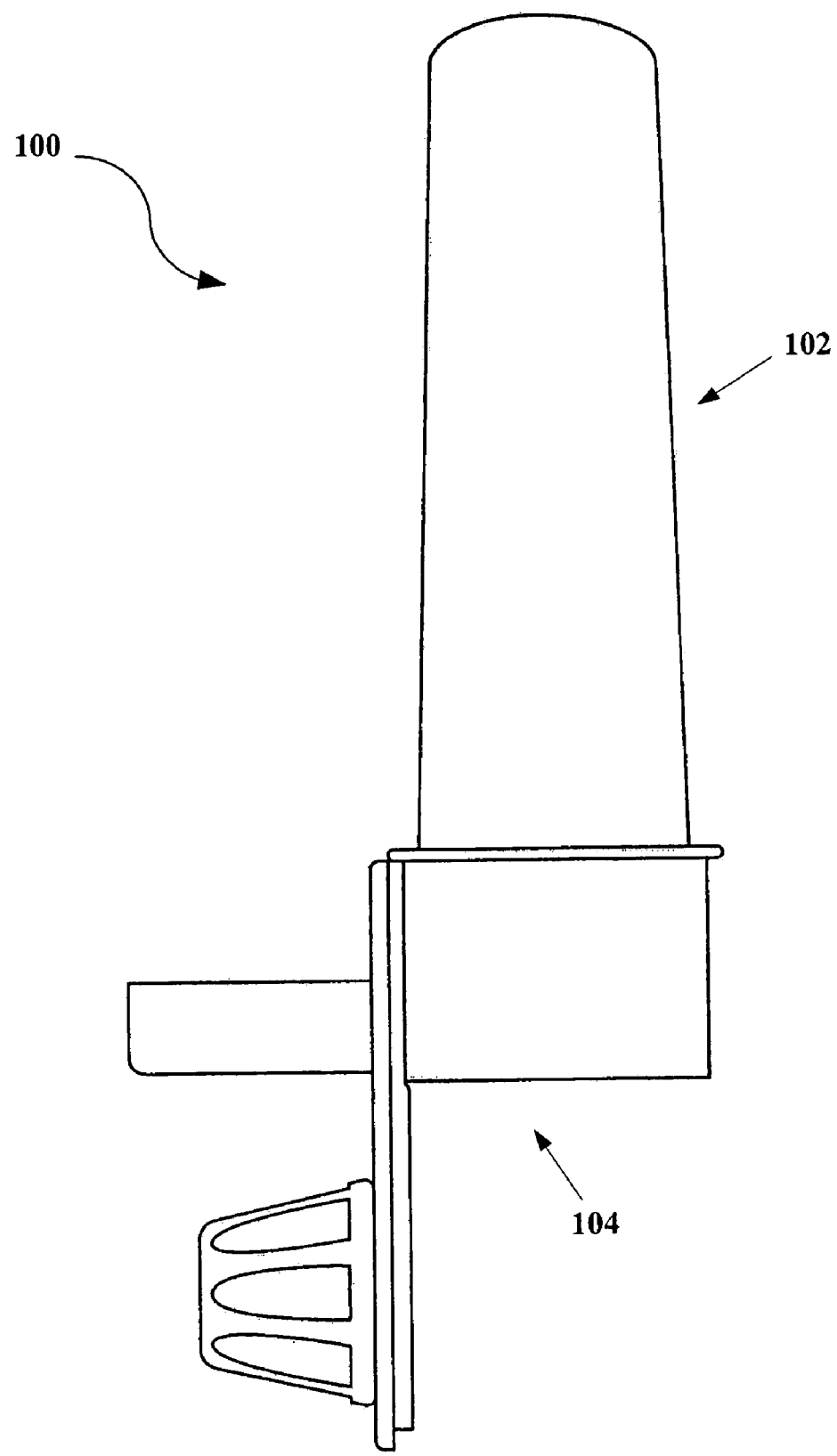
FIG. 1c illustrates a side view of the birdcage watering device.

FIGS. 1a, 1b, and 1c illustrate perspective, rear, and side views (respectively) of a birdcage attachment; specifically, a watering device that allows for an easy, non-spilling application of water and minimal disturbance of a bird inside a birdcage. As shown in FIGS. 1a–1c, birdcage watering device 100 comprises water holding device 102, designed to be located on the outside of the cage, and attachment device 104, designed in the preferred embodiment to be secured via a mounting plate on a birdcage on the outside of the cage. The attachment of the device 100 is discussed in further detail below.

Figure 2:
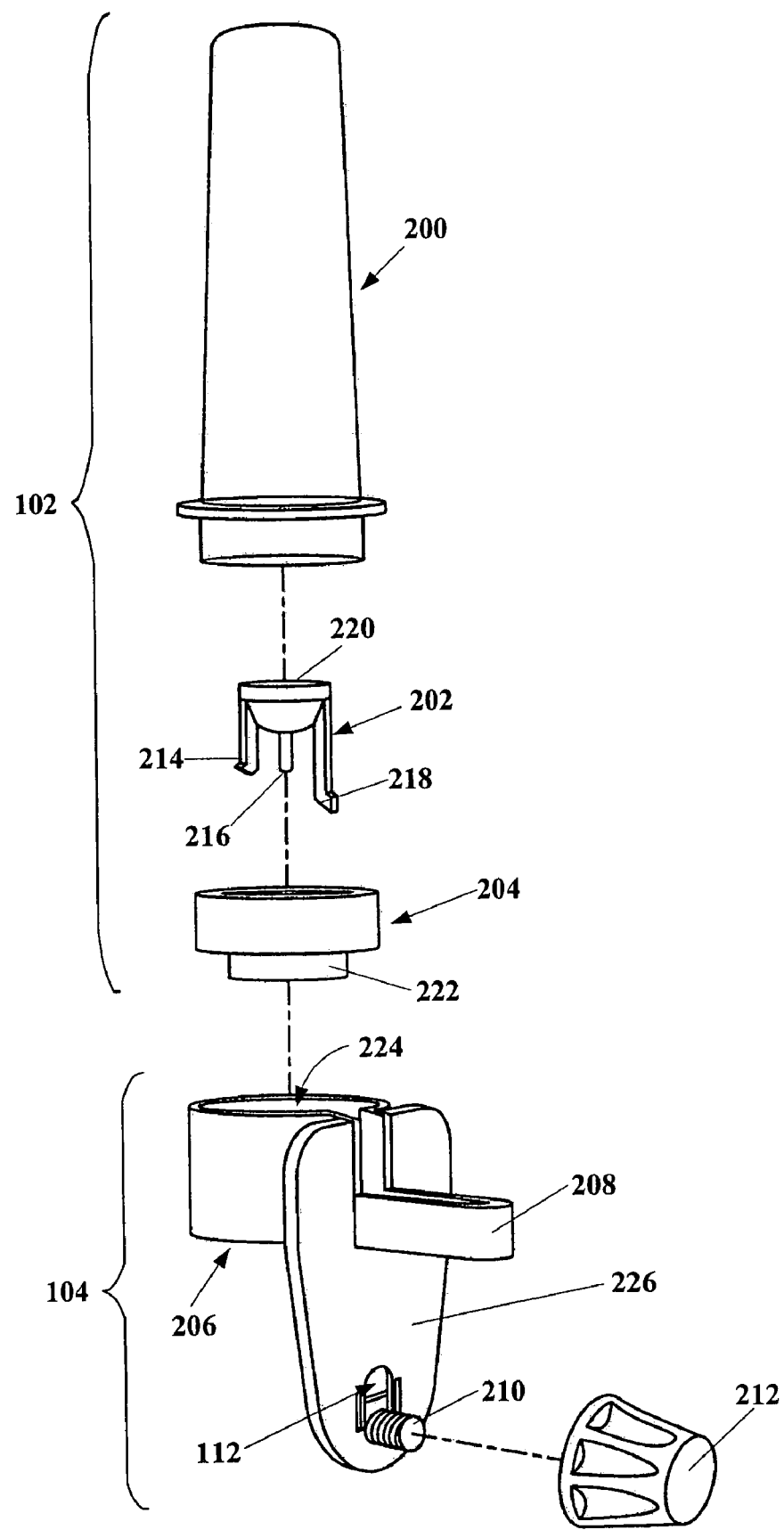
FIG. 2 illustrates the components of the birdcage watering device.

FIG. 2 illustrates the components of the birdcage watering device of the present invention. Water holding device 102 of the present invention comprises water reservoir or chamber 200, valve 202, and lid 204. Lid 204 is designed to be placed on the bottom of water chamber 200. Lid 204 has an opening such that valve 202 may be placed inside. Valve 202 is a no-spill or stop valve comprising top plate 220 and rods or legs 214, 216, and 218. Valve 202 is designed to freely move up and down within the opening of lid 204. The legs are designed to have protrusions on the ends thereof. The protrusions on legs 214 and 216 prohibit the valve from being detached from the lid by catching an extended rim surrounding the opening in the middle of the lid (not shown). The protrusion of leg 218 is discussed further below.

Attachment device 104 comprises holder 206, trough 208, fastener 210, cap 212, and mounting plate 226. Fastener 210 is provided with mounting plate 226. Preferably, fastener 210 is a screw post and cap 212 is a nut. Although a screw post fastener is illustrated in the figures, it should be noted that any type of mechanism, such as a push-lock, snap-lock, or the like that allow the holder to be locked from the inside of the birdcage and secures the watering device to the birdcage may also be used. Furthermore, referring back to FIGS. 1a and 1b, fastener 210 preferably comprises a restraining device 110 within opening 108 of mounting plate 226. Fastener 210 is placed through hole 112 of mounting plate 226 to connect with cap 212. As fastener 210 is tightened, restraining device 110 slides within opening 108 to tighten around a birdcage and device 100 is secured. Methods of attaching device 100 to a birdcage are further discussed in FIG. 3.

Holder 206 comprises opening 224 allowing water holding device 102 to be inserted therein. A narrow trough 208 extends from mounting plate 226 and is connected to opening 224. Trough 208 is designed to hold a small amount of water accessible to the bird(s) in the birdcage. The narrow trough, as shown in the figures, aids in decreasing the amount of water spilled inside the cage.

Preferably, as seen in FIG. 2, leg 218 of valve 202 is extended such that it is longer than legs 214 and 216. This "three-leg construction" allows valve 202 to be displaced from the drinking end of trough 208 when attached to holder 206. Furthermore, this three-leg construction creates an angled opening of the valve. The protrusion of extended leg 218 is designed to catch edge 222 of lid 204 when correctly assembled, thus creating the angled opening (see also FIG. 4B). The angled opening permits easy flow of water from the water chamber 200 into holder 206 and trough 208 while also preventing clogging of the valve opening, i.e. preventing water from getting "stuck" in the valve opening due to surface tension. It should be noted that, although three legs are shown in the figure, any number of legs, wherein one leg is longer than the others, that allow the valve to create an angled opening such that the flow of water is not "stuck" may also be used.

Figure 3A:
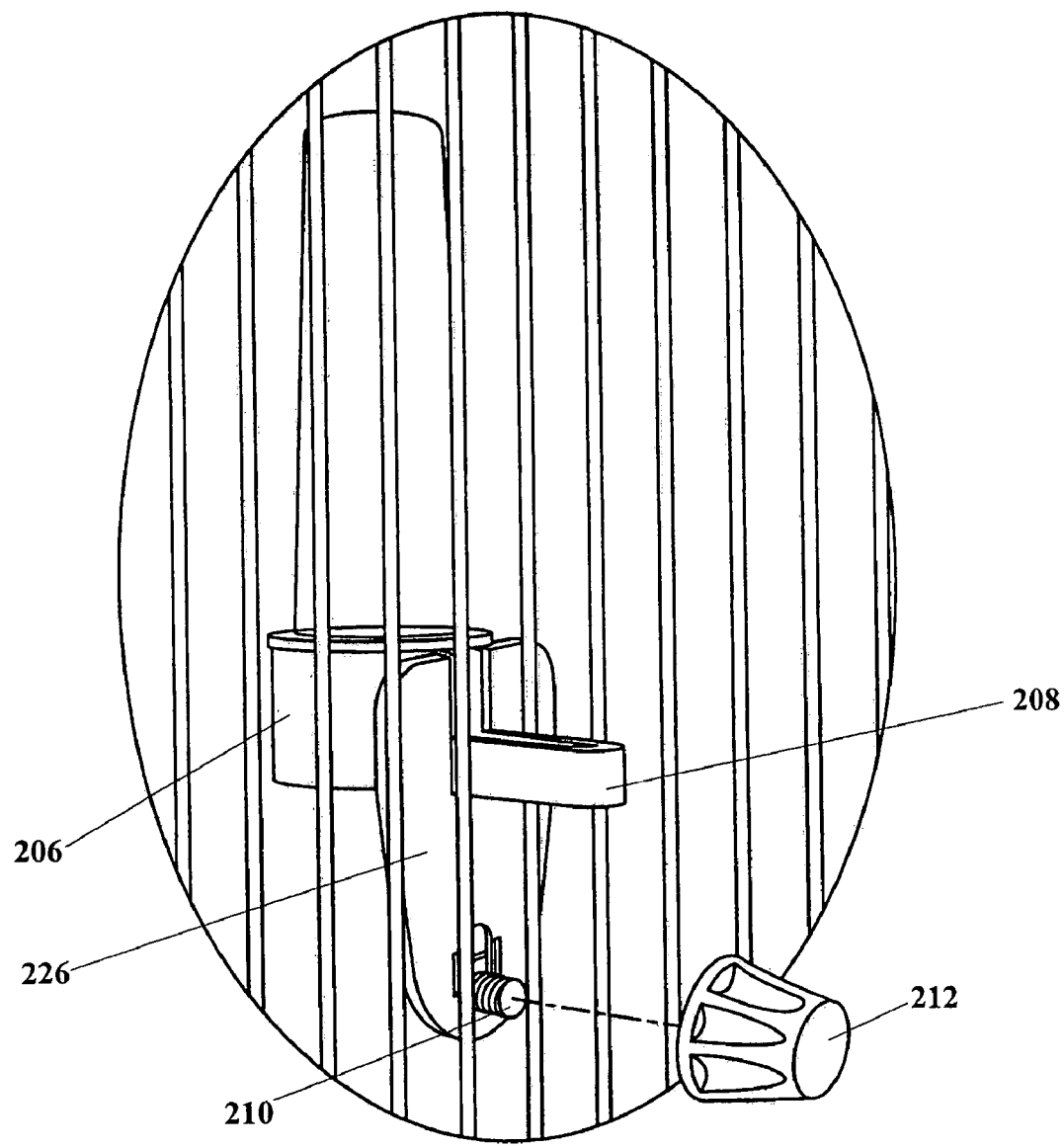
FIG. 3a illustrates the attachment of the birdcage watering device to a birdcage with vertically spaced bars.
Figure 3B:
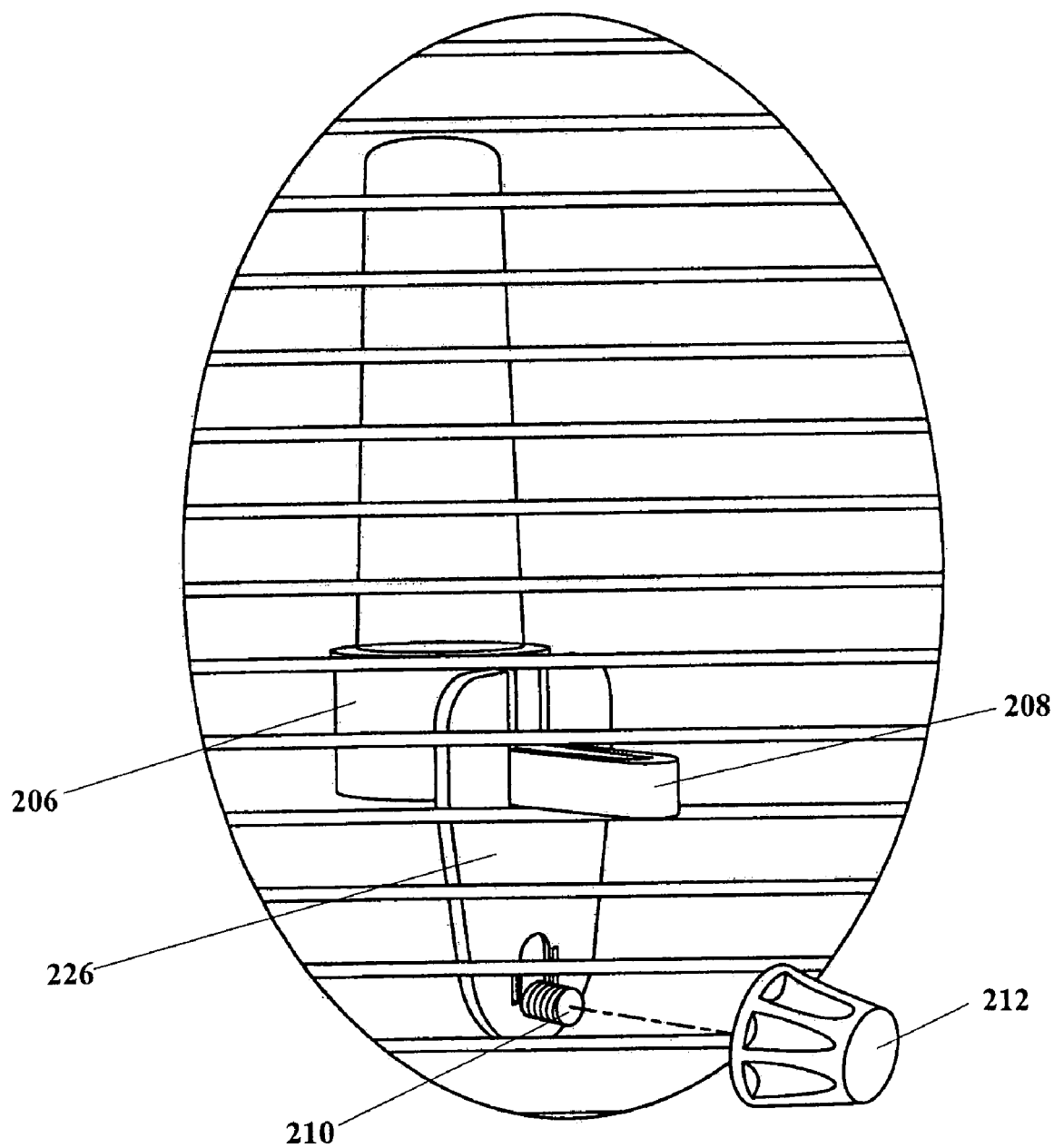
FIG. 3b illustrates the attachment of the birdcage watering device to a birdcage with horizontally spaced bars.

FIGS. 3a and 3b illustrate the method of attachment of the birdcage watering device to vertically-oriented bars and horizontally-oriented bars, respectively. As previously mentioned, the method of attachment allows watering device 102 and holder 206 to be on the outside of the birdcage while being secured from the inside of the cage. Holder 206 is preferably designed to be attached to the outside of the cage via mounting plate 226, fastener 210, and cap 212. To mount mounting plate 226 to the birdcage, trough 208 and fastener 210 are placed through the bars of the birdcage. Cap 212 is screwed onto fastener 210 from the inside of the birdcage until holder 206 and mounting plate 226 are tightened and locked in place. Thus, contrary to prior art devices, holder 206 never has to be detached from the cage when refilling chamber 200. An alternative method of attachment, without a mounting plate, is discussed below.

Figure 4A:
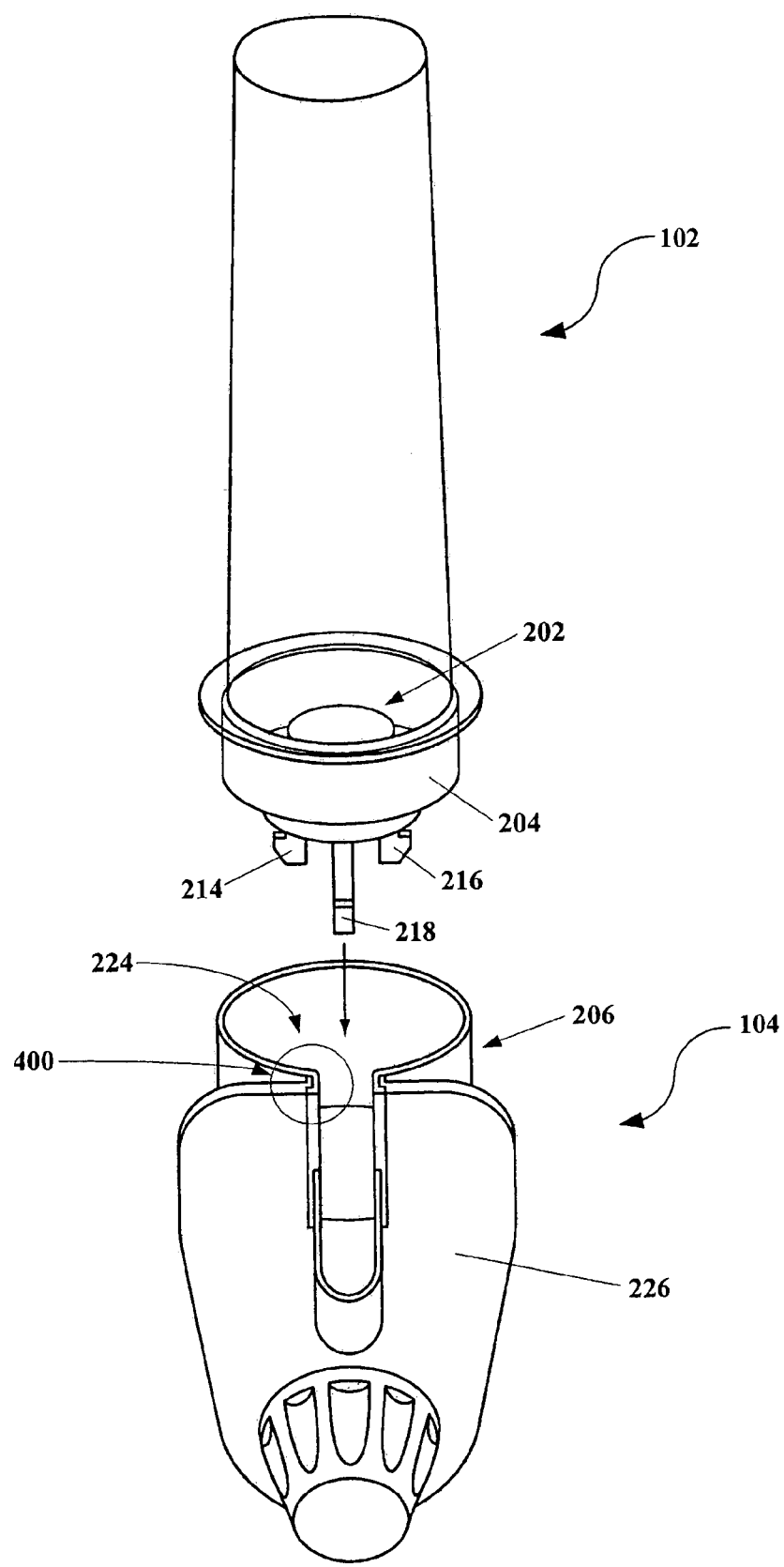
FIG. 4a illustrates the alignment of the water chamber with the holder of the watering device.
Figure 4B:
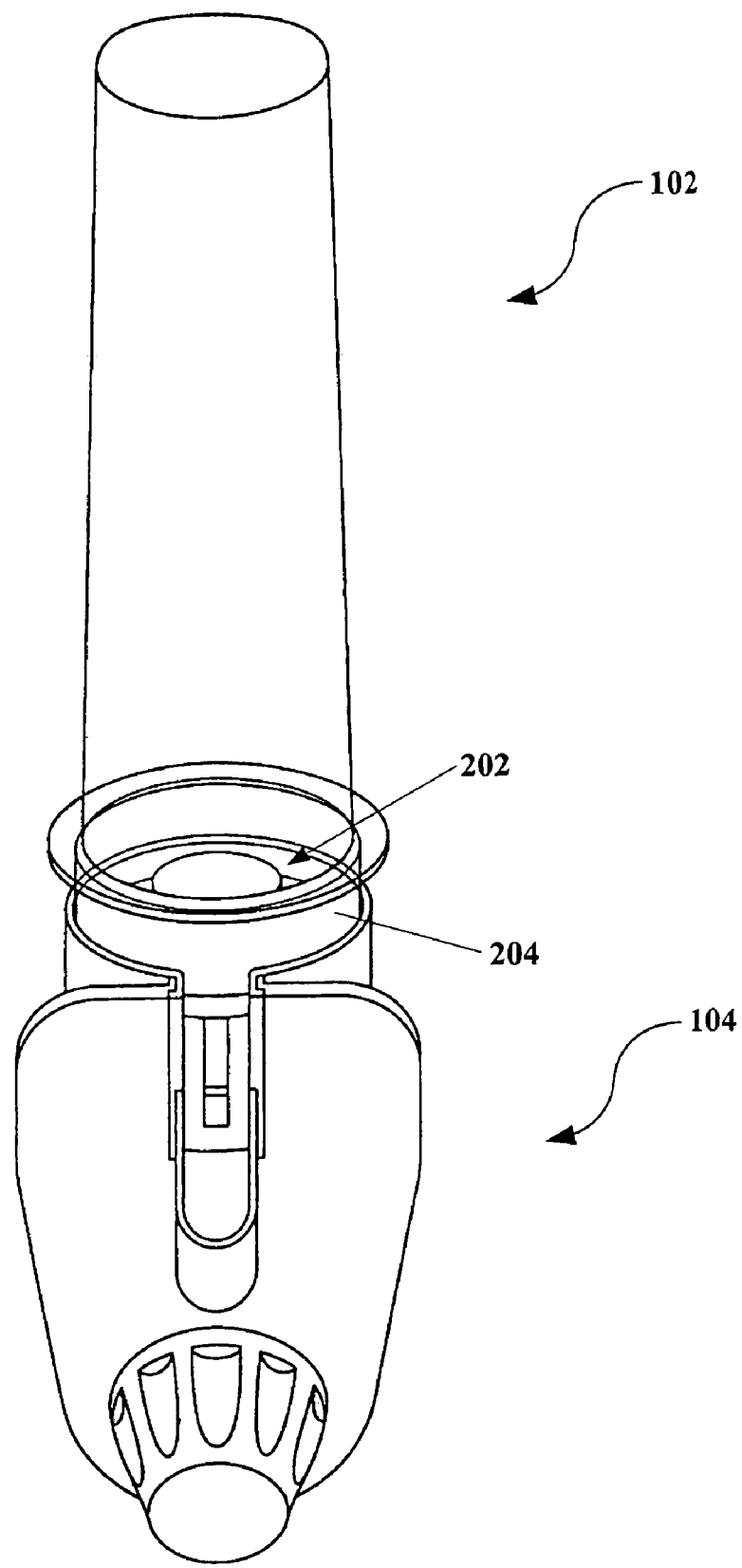
FIG. 4b illustrates the insertion of the water chamber into the holder of the watering device.
Figure 5:
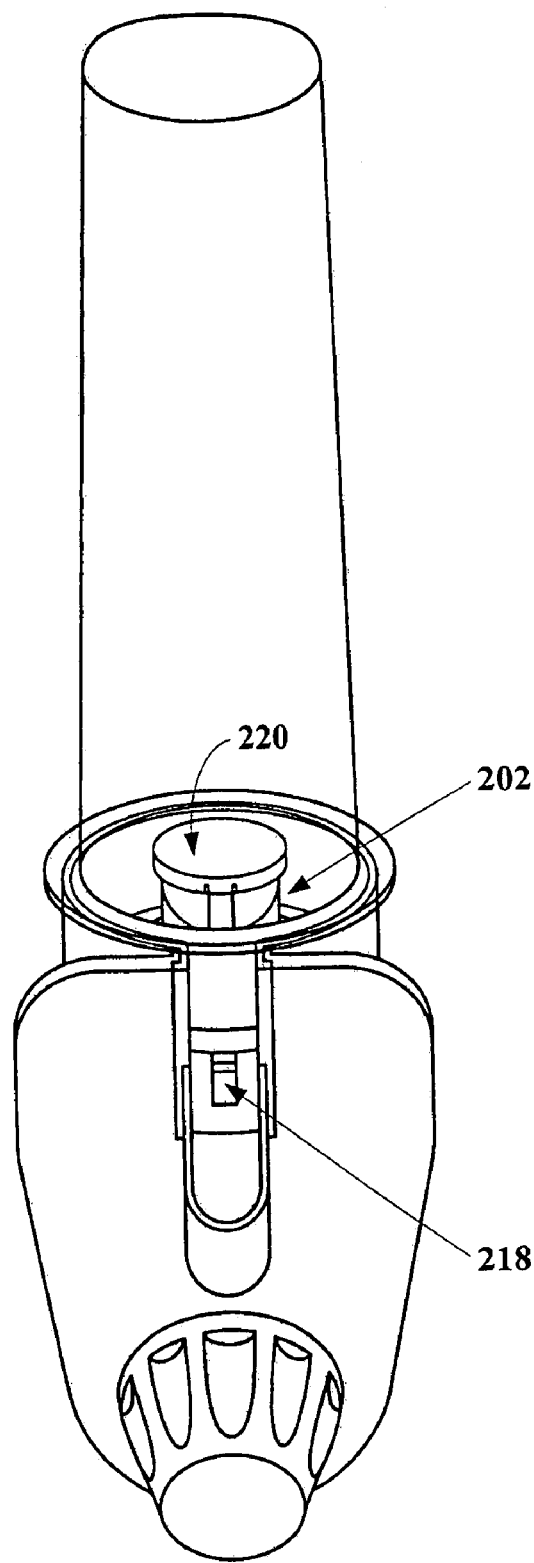
FIG. 5 illustrates a front view of the birdcage watering device.

FIGS. 4a and 4b illustrate the method of aligning and inserting water holding device 102 with attachment device 104 upon the need for the refilling of water. First, water holding device 102 is easily removed from attachment device 104 by pulling it from opening 224. Lid 204 is also easily removed by turning chamber 200 upside-down and using manual force to pull or unscrew lid 204 from the rim. After water chamber 200 is filled with water, lid 204 with valve 202 is assembled onto chamber 200. Chamber 200, then, may now be turned upside down. Valve 202, by its own weight, will close the opening in lid 204 such that no water will leak from chamber 200. Chamber 200 is then placed into alignment with holder 206 of attachment device 104, as shown in FIG. 4a. FIG. 4b illustrates the insertion of water holding device 102 into attachment device 104. Finally, FIG. 5 illustrates a front view of the birdcage watering device when fully assembled. Before water holding device 102 comes to rest in its final position in holder 206, extended leg 218 of valve 202 will reach the bottom of the holder, and as the chamber reaches its lowest position, valve 202 will be pushed up and held in an open position to allow water to fill holder 206 and trough 208. As previously mentioned, valve 202 is preferably held in an angled position for easy flow.

Also shown in FIG. 4a is tight connection 400 of holder 206 and mounting plate 226. Referring back to FIGS. 1a and 1b, shown is a channel 106 on the back of mounting plate 226. In an alternative embodiment, holder 206 is slidably detachable from mounting plate 226 via channel 106. Holder 206 may be mounted to a birdcage without the use of mounting plate 226, fastener 210, and cap 212. Various methods of locking holder to a birdcage may be used, for example, device 100 may be designed for trough 208 to frictionally fit within the bars of the birdcage, or attachments may be provided on holder 206 to lock the device 100 onto the bars of the birdcage. These examples, however, should not limit the scope of the invention and it should be noted that alternative methods of attaching the device to the outside of the birdcage without a mounting plate may be used.

CONCLUSION

A system and method has been shown in the above embodiments for the effective implementation of a birdcage watering device. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by size, materials, or specific manufacturing techniques. The design and shape of the water chamber, holder, mounting plate, and trough should not be limited to those shown in the figures such that they are able to perform the same basic function and objective of a no-spilling water device. Also, the number of rods or legs of the valve used to create the angled opening should also not be limited to a specific number. Finally, the type of fastener and cap construction and method for locking the devices together such that the birdcage watering device is secured to the cage should also not be limited to the screw fastener as shown in the figures.

The angled valve may also be used separately and in different applications to provide a no-spill solution to fluid flow.

The invention claimed is:

1. A birdcage watering device comprising:
   a water holding device comprising a chamber, a lid and a stop valve, the stop valve being movable by gravity relative to the lid from a first open position permitting gravity flow of water into the chamber through a central opening in the chamber to a closed position closing the central opening and preventing gravity flow of water out of the chamber when the birdcage water holding device is turned from a substantially upright position to a substantially downward position, said stop valve being angled with respect to the chamber to permit easy angular flow of water;
   a holder for securing said water holding device to a birdcage and having an inner surface, said stop valve comprising a plurality of legs wherein one leg is longer than the other legs, the plurality of legs being received on the surface and the longer leg being displaced by the surface of the holder relative to the chamber to create a second angled open position for angled gravity flow of water out of the chamber;
   a trough extending outwardly from a mounting plate to deliver water from said holding device; and
   wherein said water holding device may be removed from said holder for refilling said chamber.

2. A birdcage watering device as per claim 1, wherein said holder comprises a mounting plate for mounting said water holding device.

3. A birdcage watering device as per claim 1, wherein said mounting plate is secured via a fastener and cap.

4. A birdcage watering device as per claim 1, wherein said holder is mounted on the outside of the birdcage.

5. A birdcage watering device as per claim 1, wherein said holder is frictionally fit within the bars of the birdcage.

6. A birdcage watering device comprising:
a water holding device comprising a chamber and stop valve, said stop valve comprising a top plate and a plurality of extended legs, and where at least one of the plurality legs is longer in length than others of the plurality of legs;
a holder for securing said water holding device to a birdcage, the holder comprising a holding surface, the plurality of legs resting on the holding surface and the longer leg being displaced relative to the chamber to create an angular opening for easy angular flow of water;
a trough extending outwardly from a mounting plate to deliver water from said holding device; and
wherein said water holding device may be removed from said holder for refilling said chamber.

7. A birdcage watering device as per claim 6, wherein said holder comprises a mounting plate for mounting said water holding device.

8. A birdcage watering device as per claim 7, wherein said mounting plate is secured via a fastener and cap.

9. A birdcage watering device as per claim 6, wherein said holder is mounted on the outside of the birdcage.

10. A birdcage watering device as per claim 6, wherein said holder is frictionally fit within the bars of the birdcage.

11. A birdcage watering device as per claim 6 wherein said others of the plurality of legs of said valve are equal in length.

12. A birdcage watering device comprising:
a water holding device comprising a chamber and stop valve, said stop valve comprising a top plate and a plurality of legs, and where one of the plurality of legs is longer in length than the other of the plurality of legs;
a holder for securing said water holding device to a birdcage, said holder comprising a holding surface, the plurality of legs resting on the surface and the longer leg being displaced by the surface relative to the chamber to create an angular flow from the chamber;
a trough extending outwardly from a mounting plate to deliver water from said holding device; and
wherein said water holding device may be removed from said holder for refilling said chamber.

13. A birdcage watering device as per claim 12, wherein said holder comprises a mounting plate for mounting said water holding device.

14. A birdcage watering device as per claim 13, wherein said mounting plate is secured via a fastener and cap.

15. A birdcage watering device as per claim 12, wherein said holder is mounted on the outside of the birdcage.

16. A birdcage watering device as per claim 12, wherein said holder is frictionally fit within the bars of the birdcage.

17. A birdcage watering device as per claim 12, wherein said the other of the plurality legs of said valve are equal in length.

18. A birdcage watering device as per claim 12, wherein said plurality of legs comprise an odd number of legs.

19. A birdcage watering device as per claim 12, wherein said plurality of legs comprise three legs.

20. A birdcage water holding device comprising:
a chamber for holding water;
a lid having a central opening for permitting water flow and an edge for restraining the movement of a stop valve;
the stop valve being movable relative to the lid from an open position permitting gravity flow of water into the chamber through the central opening to a closed position closing the central opening and preventing gravity flow of water out of the chamber when the birdcage water holding device is turned from a substantially upright position to a substantially downward position, the stop valve being in a maximal open position when restrained by the edge; and
wherein the stop valve comprises a plurality of legs resting on a common surface, the plurality of legs comprising a first leg longer than at least one other leg, the stop valve being angled with respect to the lid to permit easy angular flow of water when the first leg is displaced relative to the central opening when in contact with the common surface.

21. The birdcage water holding device of claim 20, wherein the stop valve is displaceable to a second open position permitting gravity flow of water from the chamber through the central opening.

22. A birdcage watering device comprising:
a water holding device comprising
a chamber for holding water;
a lid having a central opening for permitting water flow and an edge;
a stop valve movable relative to the lid from a first open position permitting gravity flow of water into the chamber through the central opening to a closed position closing the central opening and preventing gravity flow of water out of the chamber when the birdcage water holding device is turned from a substantially upright position to a substantially downward position;
the stop valve comprising a plurality of legs wherein a first leg is longer than at least one other leg and a second leg is shorter than at least one other leg, the stop valve being in a maximal open position when the second leg is restrained by the edge;
a holder for securing the water holding device to the birdcage, the holder receiving the water holding device so that the stop valve is displaced to a second open position permitting gravity flow of water from the chamber through the central opening; the second leg being restrained by the edge such that the stop valve is angled with respect to the central opening to permit easy angular flow of water through the central opening.

* * * * *